United States Patent Office 3,435,003
Patented Mar. 25, 1969

3,435,003
CROSS-LINKED THERMALLY REVERSIBLE POLYMERS PRODUCED FROM CONDENSATION POLYMERS WITH PENDANT FURAN GROUPS CROSS-LINKED WITH MALEIMIDES
James M. Craven, Cardiff, Wilmington, Del., assignor to E. I. du Pont de Nemours and Company, Wilmington, Del., a corporation of Delaware
No Drawing. Filed June 1, 1966, Ser. No. 554,300
Int. Cl. C08g *17/14, 51/84, 22/02*
U.S. Cl. 260—47          10 Claims

ABSTRACT OF THE DISCLOSURE

Polymer products having thermally reversible cross-linking, which comprise chains of saturated condensation polymer backbones bearing furan groups reacted with maleimides, useful as plastics and as adhesives.

---

This invention relates to polymer products and to a process for their preparation. It is more particularly directed to cross-linked condensation polymers whose cross-linking is thermally reversible.

Polymer products should, for most uses, be insoluble in common solvents. For many purposes, such products should also have the ability to the post-formed, i.e., the ability to be molded and to hold their new shapes indefinitely. Heretofore, these properties were considered mutually exclusive. Polymer products having poor solubilities in common solvents could be gotten by well-known procedures, but when this was done, the post-formability of the products was usually poor or non-existent. And conversely, polymer products which could be satisfactorily post-formed were usually soluble in common solvents. This invention now provides polymer products which are insoluble in common solvents and post-formable because of their unique internal cross-linking arrangement.

The products of the invention are based on chains of saturated [1] condensation polymer backbones which bear furan groups represented by the structure (1)

where $n$ is a number 1–10.

These groups can be pendant to the backbones, can be situated at the backbones' ends, or both, and are present in such numbers that the polymer backbones have $M_c^*$ values [2] of from about 30 to a number equal to about one-half of the number average molecular weight of the backbones. The backbones will have number average molecular weights of about 1,000–500,000.

The products of the invention are these polymer chains, cross-linked by reacting the formula (1) groups on them with about 1–100%, preferably 10–100%, by weight of the stoichiometric amount required to react with all of the formula (1) groups, of a maleimide compound represented by the structure (2)
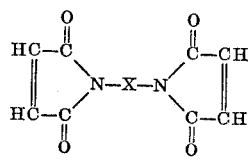

where X can be

$-(CH_2)_n-$ (where $n$ is a number 2–36); or

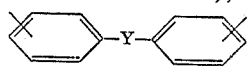

(where Y is —O—, —S—, —CH$_2$—, or

or the structure (3)
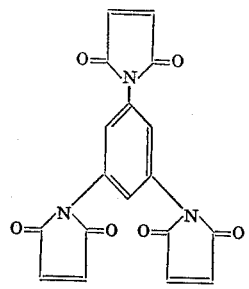

"Cross-linking" is used here in its customary sense to define the process of bridging the backbone polymer chains by reacting the Formula 1 groups, borne on the polymer backbones, with bis-maleimides to form more complex materials.

Surprisingly, this cross-linking can be reversed by heating the product. "Reversed" does not mean that the cross-linked polymer product can be completely converted to its original components, but that it becomes a more plastic material, capable of being formed and shaped. When this heated material cools, it again cross-links to form the stiffer product. This cycle permits the products of the invention to be post-formed by heating them to the "reversal" temperature (usually about 120–140° C.), shaping or molding them, and then letting the new shapes cool.

THE BACKBONES AND HOW THEY CAN BE MADE

The polymeric backbone chains can be any saturated condensation polymers. Illustrative of such polymers are polyesters, polyurethanes (both polyether and polyester types), polyureas, polyimides, and polyamides. The Formula 1 groups can be attached to these backbones during the backbones' formation by using Formula 1 containing comonomers such as:

(1) N,N-bis(2-hydroxyethyl)furfurylamine
(2) N,N'-bis(furfuryl)1,6-hexanediamine
(3) N,N'-bis(furfuryl)-ethylenediamine
(4) N,N'-bis(furfuryl)-1,10-decanediamine
(5) Bis(3-furfurylaminopropyl)methylamine
(6) 1,4-bis(3-furfurylaminopropyl)piperazine
(7) N,N'-bis(furfuryl)-1,2-propylenediamine ---
[1] "Saturated" means free of ethylenic unsaturation.
[2] $M_c^*$ is the number average molecular weight of the polymer chain segments between the Formula 1 groups on the polymer backbones. This value is calculated from the known empirical composition of the polymer product.

(8) N-methyl-N'-furfuryl-1,6-hexanediamine
(9) 2-(furfurylamino)ethanol
(10) N,N-bis(3-aminopropyl)furfurylamine
(11) Bis(3-furfurylaminopropyl)furfurylamine
(12) N-furfuryl-1,3-propanediamine
(13) Furfurylsuccinic acid
(14) 2-furfuryl-1,4-butanediol
(15) N,N-bis(2-hydroxyethyl)-2-furanpropylamine

NOTES TO ABOVE (1) Made by reacting 1 mole of furfurylamine with 2 moles of ethylene oxide.

(2–8) and (11) Made by reacting a suitable diamine with 2 moles of furfural. The resulting intermediate compound is reduced with sodium borohydride.

(9) Made by reacting 1 mole of furfurylamine with 1 mole ethylene oxide.

(10) Made by reacting 1 mole of furfurylamine with 2 moles of acrylonitrile and then reducing the intermediate compound with lithium aluminum hydride.

(12) Made by reacting 1 mole of furfurylamine with 1 mole of acrylonitrile and then reducing the intermediate compound with lithium aluminum hydride.

(13) Made according to procedure described in Beilstein, vol. 18, pp. 336 and 340.

(14) Made from 13 by reduction with lithium aluminum hydride.

(15) Made by reacting 2 moles of ethylene oxide with 1 mole of 2-furanpropylamine, which, in turn, is prepared as described in Beilstein, vol. 18, p. 419.

The number of Formula 1 groups built into a polymer backbone in this way will depend primarily on the degree of cross-linking desired in the product. The actual number for any particular product can be varied by changing the amounts of Formula 1 containing comonomers used and can easily be determined by one skilled in the art. Generally speaking, a Formula 1 group content such that the backbones have $M_c^*$ values of 100 to 4000 will be satisfactory.

These backbone polymers can be prepared according to well-known condensation polymerization techniques. Polyurethane and polyurea backbones, for example, can be prepared by first melt-polymerizing proper quantities of suitable polyether or polyester glycols and suitable diisocyanates and then chain-extending the resulting capped glycols with suitable Formula 1 containing diols or diamines to give polyurethane polymer chains, ready for cross-linking. Polyurethane and polyurea backbones can also be made by polymerizing suitable diisocyanates with Formula 1 containing diols or diamines.

Polyester backbones can be prepared by melt polymerizing suitable dibasic acids and suitable Formula 1 containing diols or, conversely, suitable Formula 1 containing dibasic acids and suitable diols. Polyamide backbones can be similarly prepared by polymerizing suitable dibasic acids with Formula 1 containing diamines.

Backbone polymers having the Formula 1 groups at their ends can be made by reacting appropriate isocyanate capped polymers with suitable Formula 1 containing amines or alcohols such as furfurylamine or furfuryl alcohol.

The details of these methods are shown in "Preparative Methods of Polymer Chemistry" by Sorensen and Campbell, Interscience Publishers, Inc., 1961, beginning on page 57. These disclosures of Sorensen and Campbell are incorporated into this application for the sole purpose of disclosing how such condensation polymer backbones can be made.

The polymer backbones preferred for use in the preparation of the products of the invention, because they are easy to make and because their flexibilities and compositions can be easily altered by changing the ratios of their monomer components, are the polyureas, polyurethanes and the polyesters.

THE MALEIMIDES

The maleimide compounds of Formulae 2 and 3 can be made according to procedures set forth in USP 2,444,536 to Searle.

N,N'-m-phenylenebis(maleimide), 4,4'-methylenebis(N-phenylmaleimide) and 4,4'-oxybis(N-phenylmaleimide) are preferred for use in the preparation of the products of the invention because of their high reactivity and the excellent cross-linking reversibility they confer to the products.

PREFERRED PRODUCTS

From all this, it will be apparent that products of the invention most preferred for their excellent mechanical and thermal properties are composed of polyester, polyurea, or polyurethane backbone polymer chains having $M_c^*$ values of about 100–4000, cross-linked with about 10–100%, by weight of the stoichiometric amount required to react with all of the Formula 1 groups borne on the chains, of N,N'-m-phenylene-bis(maleimide), 4,4'-oxybis(N-phenylmaleimide) or 4,4'-methylenebis(N-phenylmaleimide).

HOW THE PRODUCTS ARE MADE

The products of the invention can be made by reacting one or more of the polymeric backbone types with the proper amount of a bis(maleimide) compound. The reaction is carried out by dissolving the backbone polymer in a suitable solvent such as dimethylformamide or dimethylacetamide and then adding to this solution a 1–20% (by weight) solution of a bis(maleimide) in the same solvent. These solutions are mixed and the solvent is removed by gentle heating to give a solid material. Cross-linking occurs over the next few days at room temperature.

If the backbone polymer is a liquid, the bis(maleimide) can be added directly, preferably at 120° C. The melt is then cooled to room temperature. Cross-linking takes place over the next few days.

UTILITY

The products of the invention can be used in any application where their low solubility in common solvents and their unique post-formability is desirable. They can, for example, be used to form gaskets and diaphragms. The products having polyurea backbones are especially useful in fabricating shoe uppers, where their ability to be post-formed is a special advantage in the lasting operation.

When the Formula 1 groups are borne on the polymeric backbones in a terminal position, or in mixed terminal and pendant positions, the resulting cross-linked products are exceptionally good adhesives and can be used, for example, to bond metal-to-metal, wood-to-wood and wood-to-metal. These adhesives have the advantage of loosening their grip when the bonded objects are heated.

Those polymeric backbones having $M_c^*$ values of about 100–500 give cross-linked products especially useful as film-forming ingredients in coating compositions. The polymeric solutions, before evaporation of solvent and cross-linking, can be used directly for these purposes. Finishes of such compositions have high impact strength and have the added advantage of being easily repaired by heating.

EXAMPLES

The invention is illustrated by the following examples in which all parts and percentages are by weight unless otherwise indicated.

Example 1

PREPARATION OF N,N-BIS(2-HYDROXYETHYL) FURFURYLAMINE

The gaseous ethylene oxide obtained by heating 560 parts of liquid ethylene oxide was passed into a solution of 500 parts of furfurylamine in 200 parts of water, with stirring and over a 3-hour period. The temperature was kept at about 35° C. The water and the excess ethylene oxide were then removed by vacuum distillation.

The resulting crude N,N-bis(2-hydroxyethyl)furfurylamine was purified by vacuum distillation. The center cut gave 479 parts of a substantially pure, clear, nearly colorless liquid having a boiling point of 141–143° C. at 0.8 mm. of pressure.

Example 2

PREPARATION OF N,N'-BIS(FURFURYL)-1,6-HEXANEDIAMINE

Freshly distilled furfural (552 parts) was added dropwise, with stirring, to a solution of 334 parts of 1,6-hexanediamine in 200 parts of distilled water under nitrogen. The temperature was maintained at 15–20° C. by cooling the reaction mass in an ice bath during the addition.

After addition was complete, the mixture was stirred for an additional 15 minutes and then allowed to stand for a few minutes. The lower organic layer was then separated from the upper aqueous layer with a separatory funnel. Crystallization was induced in this organic phase by adding seed crystals (obtained by scratching a little of the organic layer with a glass rod). The resulting solid block of crystals was cut into small pieces with a knife and dried under vacuum. This gave 784 parts of solid Schiff base.

This Schiff base (272 parts) was dissolved in 1000 ml. methyl alcohol, and 92.5 parts of sodium borohydride were added in small portions over a 3-hour period. The resulting solution was then heated at reflux for 1 hour, cooled to room temperature and poured into 3000 parts of water.

Crude N,N'-bis(furfuryl)-1,6-hexanediamine was isolated from this solution by extracting it with 450 parts of diethyl ether, and then evaporating the ether. The crude product was vacuum distilled to give 167 parts of pure N,N'-bis(furfuryl)-1,6-hexanediamine, a clear pale yellow liquid having a boiling point of 152–153° C. at 0.3 mm. of pressure.

Example 3

PREPARATION OF A PRODUCT HAVING A POLYESTER BACKBONE

A mixture of 101.2 parts (0.5 mole) of sebacic acid and 92.6 parts (0.5 mole) of N,N-bis(2-hydroxyethyl)furfurylamine was heated under nitrogen with stirring. The temperature of the mixture was raised from 150° C. to 190° C. over a 1-hour period and then held at this temperature for 1½ hours as water was distilled from the melt. A vacuum (0.6–1.5 mm.) was then applied and the polymer melt heated for 3 hours at 190° C. and for 11 hours at 225° C. The resulting polyester backbone polymer, having pendant furan groups, had an inherent viscosity of 0.23 (0.5% in benzene at 25° C.) and an $M_c^*$ value of 270.

Fifty parts of this polymer were dissolved in 100 parts of dimethylformamide. To 70 parts of this solution were added, with stirring, 1.72 parts of N,N'-m-phenylenebis(maleimide) (19% of the stoichiometric amount required to react with all of the furan groups). This solution was coated on a glass plate and the solvent removed by heating the plate at 100° C. for 4 hours. The plate was then allowed to stand at room temperature for several days. The resulting clear, brown, flexible, rubbery film was then stripped from the plate. The film had an initial modulus of 165 lb./in.$^2$, a tensile strength of 135 lb./in.$^2$ and an ultimate elongation of 70%. It could be remolded at 140° C.

To another 70-part portion of the polymer solution was added, with stirring, a warm solution of 8.60 parts of N,N'-m-phenylenebis(maleimide) (97% of the stoichiometric amount required to react with all of the furan groups on the backbone) in 50 parts of dimethylformamide. The solution was immediately coated on a glass plate and the solvent removed by heating at 100° C. for 4 hours. The plate was allowed to stand several days and the resulting clear film was then stripped from the plate. In contrast to the flexible, rubbery film obtained when the smaller amount of N,N'-m-phenylenebis(maleimide) was used, this film was stiff and strong. It had an initial modulus of 120,000 lb./in.$^2$, a tensile strength of 6800 lb./in.$^2$ and an ultimate elongation of 9%. The film became tacky and soft when heated to 140° C. In this state it was twisted and bent into various shapes. After standing for several days at room temperature, the film became stiff and strong again, retaining its new shape.

The solution described in the preceding paragraph can be used to provide a tough, repairable, solvent resistant coating by applying the solution to an object to be protected, evaporating the solvent at 100° C. and then letting the object stand for several days.

Example 4

PREPARATION OF A PRODUCT HAVING A POLYAMIDE BACKBONE

Polytetramethylene ether glycol (832 parts) having a number average molecular weight of 985 was dried by heating it for 45 minutes at 70° C. and at 0.3 mm. of pressure. Benzoyl chloride (10 drops) was then added to the glycol, with stirring. Methylenebis(4-phenylisocyanate) (423 parts), previously purified by vacuum distillation, was then added and the resulting mixture heated at 70° C. for 90 minutes under anhydrous conditions.

The resulting prepolymer, a colorless viscous liquid, was cooled to 25° C. and then dissolved in 1499 parts of dimethylformamide, previously purified by treating it with 5% of methylene-bis(4-phenylisocyanate) and then vacuum distilling it.

A portion (1237 parts) of the resulting prepolymer solution was added, with stirring, to a solution of 105.0 parts of N,N'-bis(furfuryl)-1,6-hexanediamine in 2000 parts of dimethylformamide (purified as before). Occasional cooling was required to maintain the temperature of the solution between 20 and 30° C. during the addition, which took 2 hours. Butyl alcohol (15 parts) was then added to destroy traces of isocyanate that might still have been present in the solution.

The resulting backbone polymer solution contained 20% of polymer and had a viscosity of 318 poises. The solid polymer was isolated by coating some of the polymer solution on a glass panel and evaporating the solvent at 100° C. The resulting soft, tacky, rubbery polymer, having pendant furan groups, had an inherent viscosity of 1.14 (0.5% in hexamethylphosphoramide at 25° C.) and an $M_c^*$ value of 800.

To portions of this polymer solution were added enough of 11–14% solutions of various bis(maleimides) in dimethylformamide to react with 50% of the furan groups on the backbone polymer. The resulting solutions were coated on glass plates, the solvent was evaporated at 100° C. and the films were stripped from the glass plates and allowed to stand several days at room temperature. The clear, elastomeric films had the following properties:

| Bis(maleimide) | Stress at 100% Elongation (lb./in.$^2$) | Tensile Strength (lb./in.$^2$) | Ultimate Elongation (percent) |
|---|---|---|---|
| 1. N,N'-hexamethylenebis(maleimide) | 870 | 3,700 | 190 |
| 2. N,N'-m-phenylenebis(maleimide) | 1,230 | 5,100 | 190 |
| 3. N,N'-p-phenylenebis(maleimide) | 1,190 | 5,100 | 190 |
| 4. 4,4'-oxybis(N-phenylmaleimide) | 1,320 | 5,500 | 210 |

These films can be heated to about 130° C. and vacuum-formed. The new shapes are permanent. Products 2, 3 and 4 can be used as shoe upper materials.

Example 5

PREPARATION OF A PRODUCT HAVING A POLYURETHANE BACKBONE

To dry polytetramethylene ether glycol (125.6 parts), having a number average molecular weight of 985, were added 3 drops of benzoyl chloride and 63.7 parts of purified methylenebis(4-phenylisocyanate). The mixture was heated with stirring at 70° C. for 2 hours under dry nitrogen. The resulting prepolymer was cooled to 40° C. and 2 drops of dibutyltin dilaurate were added.

A solution of 22.9 parts of N,N-bis(2-hydroxyethyl)furfurylamine in 209.7 parts of dimethylacetamide (purified in a manner similar to that used for purifying dimethylformamide in Example 4), were then added, with stirring. About 90% of the amine solution was added in 2 minutes at 35° C.; the remaining 10% was then added over a 3-hour period at 50–60° C. During the addition, the viscosity of the solution increased and portions of purified dimethylacetamide were added from time to time to make stirring easier. A total of 555.9 parts of dimethylacetamide was added for this purpose. Finally, 5.5 parts of butyl alcohol were added to destroy possible traces of isocyanate. The resulting solution contained 21% of backbone polymer and had a viscosity of 232 poises.

The backbone polymer, isolated by evaporating the solvent, had pendant furan groups, an inherent viscosity of 1.05 (0.5% in hexamethylphosphoramide at 25° C.) and an $M_c$* value of 1589.

To two portions of the backbone polymer solution were added various 5–15% solutions of N,N'-m-phenylenebis(maleimide) in dimethylacetamide. The clear elastomeric films, prepared from the solution by evaporating the solvent, had the following properties:

| Amount of bis(maleimide)* | Stress at 100% Elongation (lb./in.²) | Tensile Strength (lb./in.²) | Ultimate Elongation (percent) |
|---|---|---|---|
| 50% | 320 | 3,400 | 310 |
| 100% | 840 | 5,300 | 215 |

* Percent of stoichiometric amount required to react with all of the furan groups on the backbone polymer.

These films can be easily post-formed at 120–140° C. and are useful as gasket material.

Example 6

PREPARATION OF A POLYMER PRODUCT HAVING A POLYURETHANE/POLYUREA BACKBONE

To dry polytetramethylene ether glycol (114.6 parts), having a molecular weight of 985, were added 58.1 parts of freshly distilled methylenebis(4-phenylisocyanate) and 1 drop of benzoyl chloride. The mixture was heated at 70° C. for 2 hours under dry nitrogen, cooled to 40° C., and a solution of 10.7 parts of N,N-bis(2-hydroxyethyl)-furfurylamine in 265 parts of dimethylacetamide (purified as in Example 4) containing 2 drops of dibutyltin dilaurate was added. The mixture was stirred for 1 hour at 40° C. and 1 hour at 50° C. under dry nitrogen.

A portion (441.7 parts) of the resulting prepolymer solution was added, with stirring and over a 2-hour period, to a solution of 2.7 parts of hydrazine hydrate in 419.9 parts of purified dimethylacetamide at 27–30° C. Butyl alcohol (5.5 parts) was then added to destroy possible traces of isocyanate.

The resulting solution contained 20.9% of backbone polymer and had a viscosity of 210 poises. The backbone polymer, isolated by evaporating the solvent, had pendant furan groups, an inherent viscosity of 0.63 (0.5% in hexamethylphosphoramide at 25° C.) and $M_c$* value of 3106.

Addition to this polymer solution of various amounts of 2–4% solutions of N,N'-m-phenylenebis(maleimide) in dimethylacetamide, followed by evaporation of the solvent, gave films with the following properties:

| Amount of bis(maleimide)* | Stress at 100% Elongation (lb./in.²) | Tensile Strength (lb./in.²) | Ultimate Elongation (percent) |
|---|---|---|---|
| 25% | 620 | 8,800 | 480 |
| 50% | 700 | 7,900 | 400 |
| 100% | 950 | 5,900 | 280 |

* Percent of the stoichiometric amount required to react with all of the furan groups on the backbone polymer.

These films can be vacuum-formed at 140° C.

Example 7

PREPARATION OF A PRODUCT HAVING A POLYAMIDE BACKBONE

To a mixture of 95.5 parts of N,N'-bis(furfuryl)-1,6-hexanediamine, 250 parts of dichloromethane, 691 parts of 1 N aqueous sodium hydroxide and 309 parts of water was rapidly added, with stirring, a solution of 82.6 parts of freshly distilled sebacyl chloride in 250 parts of dichloromethane. The mixture was stirred for 15 minutes and then allowed to stand. The lower organic layer was separated, washed with three 500-part portions of water and then poured into 1500 parts of boiling water to remove the dichloromethane. The remaining gummy material was separated from the water and dried at 100° C. under vacuum. The resulting clear, gummy backbone polymer (136.7 parts) had an inherent viscosity of 0.49 (0.5% in hexamethylphosphoramide at 25° C.), pendant furan groups and an $M_c$* value of 128.

This backbone polymer (58.7 parts) was dissolved in 235 parts of dimethylacetamide. To this solution were added, with stirring, 1.97 parts of N,N'-m-phenylenebis(maleimide) (4.9% of the stoichiometric amount required to react with all the furan groups on the backbone polymer). The elastomeric film obtained by evaporating the solvent from this solution had an initial modulus of 390 lb./in.², a stress at 100% elongation of 200 lb./in.², a tensile strength of 1200 lb./in.² and an ultimate elongation of 165%. It can be post-formed at 140° C.

The N,N'-m-phenylenebis(maleimide) can be replaced with 2.66 parts of 1,3,5-phenenyltris(N-maleimide) to give a similar product.

Example 8

To 200 parts of a prepolymer prepared from 1 mole of polytetramethylene ether glycol (molecular weight 1000) and 1.6 moles of toluene-2,4-diisocyanate were added 9.48 parts of furfuryl amine and 13.48 parts of N,N'-bis(furfuryl)-1,6-hexanediamine. The resulting solution was stirred in a dry resin kettle for 1 hour at 80° C. to give a backbone polymer having both pendant and terminal furan groups, an MW of 4570 and an $M_c$* value of 1415.

To 11.4 parts of this backbone polymer solution were added 1.79 parts of 4,4'-methylenebis(N-phenylmaleimide). This suspension was homogenized by stirring at 140° C. The resulting viscous, pasty product was spread on two steel plates heated to 140° C. The plates were clamped together and cooled to room temperature.

The products' adhesive performance was determined by ASTM procedure D–1002–64 and D–1876–61T. Its lap shear strength was 1040 lb./in.² and its T-peel strength was 70 lb./in.

The bond could be loosened enough to shift the relative positions of the plates by heating them to 140° C.

The claims are:
1. A polymer product which comprises chains of saturated condensation polymer backbones, said polymer backbones having furan groups represented by the formula

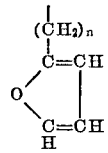

where $n$ is a number 1–10,
said backbones having $M_c^*$ values of from about 30 to a number equal to about one-half of the number average molecular weight of said polymer backbones,
reacted with
about 1–100%, by weight of the stoichiometric amount required to react with all of the furan groups on said polyer backbones, of at least one maleimide represented by the structure

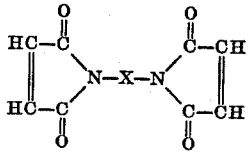

where X can be

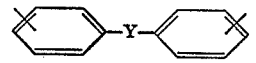 (where $n$ is a number 2–36); or

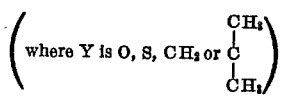

or the structure

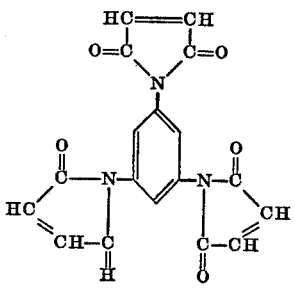

2. The product of claim 1 wherein the

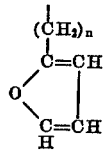

groups are pendant to the polymer backbones.

3. The product of claim 1 wherein the

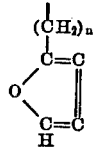

groups are terminally and pendantly attached to the polymer backbones.

4. The product of claim 1 wherein the polymer backbone is a polyurethane having an $M_c^*$ value of from about 100 to about 4000.

5. The product of claim 1 wherein the polymer backbone is a polyester having an $M_c^*$ value of from about 100 to about 4000.

6. The product of claim 1 wherein the maleimide is N,N'-m-phenylenebis(maleimide).

7. The product of claim 1 wherein the maleimide is 4,4'-oxybis(N-phenylmaleimide).

8. The product of claim 1 wherein the maleimide is 4,4'-methylenebis(N-phenylmaleimide).

9. A method for cross-linking a polymer, which polymer comprises a saturated condensation polymer backbone bearing groups represented by the formula

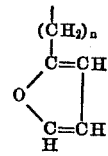

where $n$ is a number 1–10
and having an $M_c^*$ value of about 30 to a number equal to about one-half of the number average molecular weight of said polymer backbone,
said method comprising reacting said polymer backbone with about 1–100% (by weight) of the stoichiometric amount of at least one maleimide represented by the structure

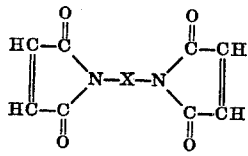

where X can be

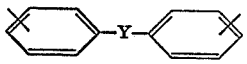 (where $n$ is a number 2–36); or

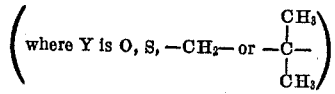

or the structure

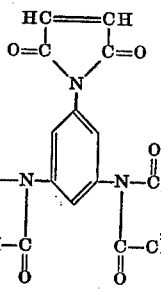

10. The product of claim 1 wherein the polymer backbone is a polyurea.

No references cited.

JOSEPH L. SCHOFER, *Primary Examiner.*

C. A. HENDERSON, JR., *Assistant Examiner.*

U.S. Cl. X.R.

156—331; 260—75, 77.5, 78